US010875634B2

United States Patent
De Dreuille De Longeville et al.

(10) Patent No.: US 10,875,634 B2
(45) Date of Patent: Dec. 29, 2020

(54) DRIVE TRAIN

(71) Applicant: SAFRAN TRANSMISSION SYSTEMS, Colombes (FR)

(72) Inventors: Thomas Marie Joseph De Dreuille De Longeville, Paris (FR); Frederic Nicolas Francois Laisnez, Cergy (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 263 days.

(21) Appl. No.: 16/075,760

(22) PCT Filed: Feb. 7, 2017

(86) PCT No.: PCT/FR2017/050272
§ 371 (c)(1),
(2) Date: Aug. 6, 2018

(87) PCT Pub. No.: WO2017/137690
PCT Pub. Date: Aug. 17, 2017

(65) Prior Publication Data
US 2019/0055011 A1    Feb. 21, 2019

(30) Foreign Application Priority Data

Feb. 8, 2016    (FR) ..................... 16 50976

(51) Int. Cl.
*B64C 27/12*    (2006.01)
*F16H 57/00*    (2012.01)
(Continued)

(52) U.S. Cl.
CPC ......... *B64C 27/12* (2013.01); *F16H 57/0025* (2013.01); *F16H 57/025* (2013.01); *F16H 57/0424* (2013.01); *F16H 2057/02043* (2013.01)

(58) Field of Classification Search
CPC ... B64C 27/12; F16H 57/0025; F16H 57/025; F16H 57/0424; F16H 2057/02043
See application file for complete search history.

(56) References Cited

U.S. PATENT DOCUMENTS

| 4,899,959 A | 2/1990 | Weiler |
| 5,203,221 A * | 4/1993 | Logsdon ................. F16D 1/096 |
| | | 403/370 |

(Continued)

FOREIGN PATENT DOCUMENTS

| EP | 0 282 784 A2 | 9/1988 |
| EP | 2 327 625 A1 | 6/2011 |
| FR | 2 756 542 A1 | 6/1998 |

OTHER PUBLICATIONS

International Search Report dated May 10, 2017 in PCT/FR2017/050272 filed Feb. 7, 2017.

(Continued)

*Primary Examiner* — Brian M O'Hara
*Assistant Examiner* — Keith L Dixon
(74) *Attorney, Agent, or Firm* — Oblon, McClelland, Maier & Neustadt, L.L.P.

(57) ABSTRACT

A drive train for a helicopter, which includes an engine, a reduction gear and a main gearbox, the reduction gear including an output shaft, which are received in assembled front and rear housings, the output shaft being supported and guided rotatably by a plurality of rolling bearings, mounted in the housings. The drive train includes a redundant mount arranged around the output shaft and between a wall of the main gearbox and the front end of the front housing, and the redundant mount is configured, sized and attached to the wall of the main gearbox and to the front end of the front housing so as to create, if the front housing breaks, a secondary path for absorbing loads passing via the redun- (Continued)

dant mount, via the output shaft of the reduction gear and via the bearings.

11 Claims, 5 Drawing Sheets

(51) Int. Cl.
 *F16H 57/025* (2012.01)
 *F16H 57/04* (2010.01)
 *F16H 57/02* (2012.01)

(56) References Cited

U.S. PATENT DOCUMENTS

| | | | |
|---|---|---|---|
| 6,019,313 A | 2/2000 | Lenhart et al. | |
| 6,058,793 A * | 5/2000 | Pasley | F16H 1/20 |
| | | | 184/6.12 |
| 6,302,356 B1 * | 10/2001 | Hawkins | B64C 27/12 |
| | | | 244/17.11 |
| 2011/0121127 A1 | 5/2011 | Certain | |
| 2018/0087639 A1 * | 3/2018 | Poster | F16H 57/02 |
| 2019/0040944 A1 * | 2/2019 | Decaux | B60W 10/06 |

OTHER PUBLICATIONS

Preliminary French Search Report dated Oct. 10, 2016 in French Application 1650976 filed Feb. 8, 2016.

* cited by examiner

DRIVE TRAIN

GENERAL TECHNICAL FIELD

The present invention relates to a drive train for helicopters and a helicopter equipped with such a drive train.

PRIOR ART

Figure 1:
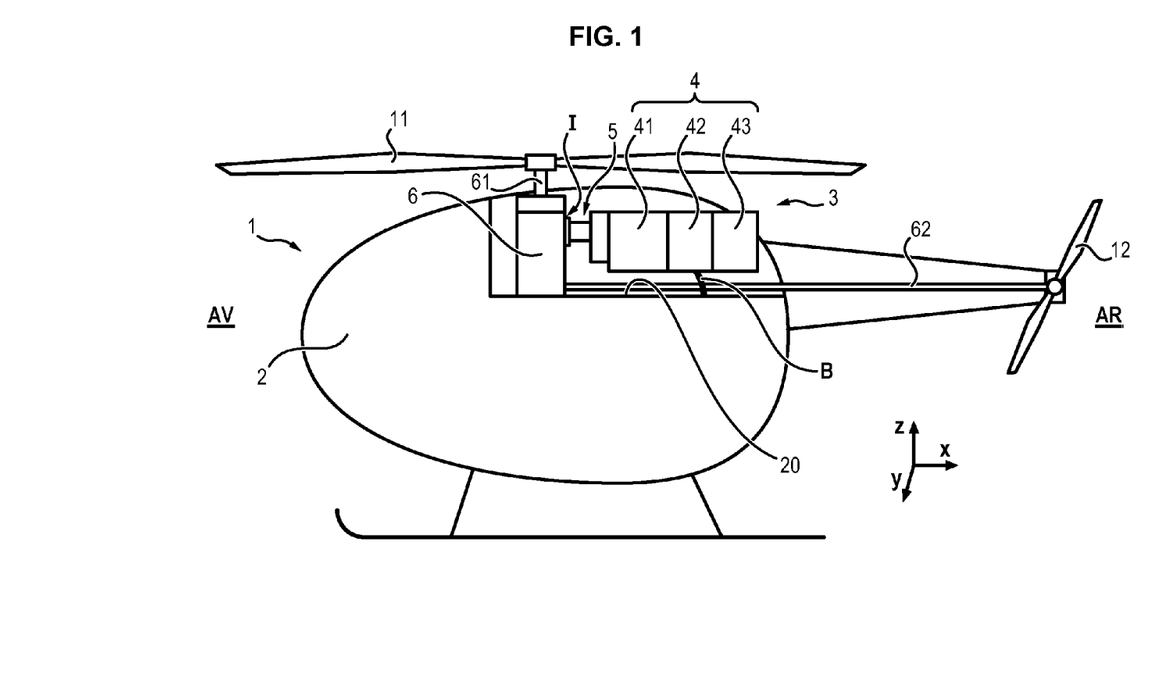
FIG. 1 is a schematic showing a helicopter provided with a drive train.

Referring to the schematic of the appended FIG. 1, a helicopter can be seen with at least one engine, which comprises a cell 2 and a drive train 3.

The helicopter 1 is equipped with a main rotor 11, for its lift and propulsion, and an anti-torque tail rotor 12.

The drive train 3 comprises at least one engine 4, capable of supplying mechanical power, a reduction gear 5 and a main gearbox 6, the function of which is to transmit the power of this engine 4 to the two rotors, so as to drive them in rotation. The rotation of the main engine 11 and of the tail rotor 12 is accomplished by two shafts, respectively labeled 61 and 62.

In the example shown in FIG. 1, the engine 4 comprises a compressor 41, a combustion chamber 42 and turbines 43.

The engine 4 could also be an internal combustion engine or an electric motor.

The reduction gear 5 comprises a series of gear pairs which reduce the rotation speed of the engine shaft of the engine 4. The output shaft of the reduction gear 5 is coupled to the input shaft of the main gearbox 6 so as to transmit engine torque to it.

Hereafter in the description and the claims, the terms "front" and "rear" are to be interpreted with respect to the front AV and the rear AR of the helicopter 1.

The reduction gear 5 is housed inside the reduction gear housing which generally has two portions, namely a smaller "front housing" and a "rear housing." The front housing is itself attached to the main gearbox 6.

The reduction gear 5 therefore has not only a mechanical power transmission function but also a function of structural retention of the engine 4 with respect to the cell 2 of the helicopter.

In the prior art, the suspension of the engine 4 and of the reduction gear 5 of the helicopter 1 is accomplished at two points, namely:

forward, at the interface 1 between the front housing of the reduction gear 5 and the main gearbox 6, so as to block four degrees of freedom namely translation (Tx, Ty and Tz) along the axes x, y and z, and rotation Mx around the axis x, and aft, by two rear suspension rods B, radial with respect to the axis of rotation of the engine, which connect the engine 4 to the floor 20 of the engine, so as to block two degrees of freedom, namely translation Ty and Tz along the axes y and z. It will be noted that only one of the rods B is visible in FIG. 1.

The engine 4 is thus mounted isostatically in the helicopter 1.

Moreover, safety standards impose that the engine 4 be held integral with the helicopter 1 and its cell 2 in any situation, that is during the normal operation of the helicopter, under limit load conditions (for example during a hard landing) or under ultimate load situations.

Figure 2:
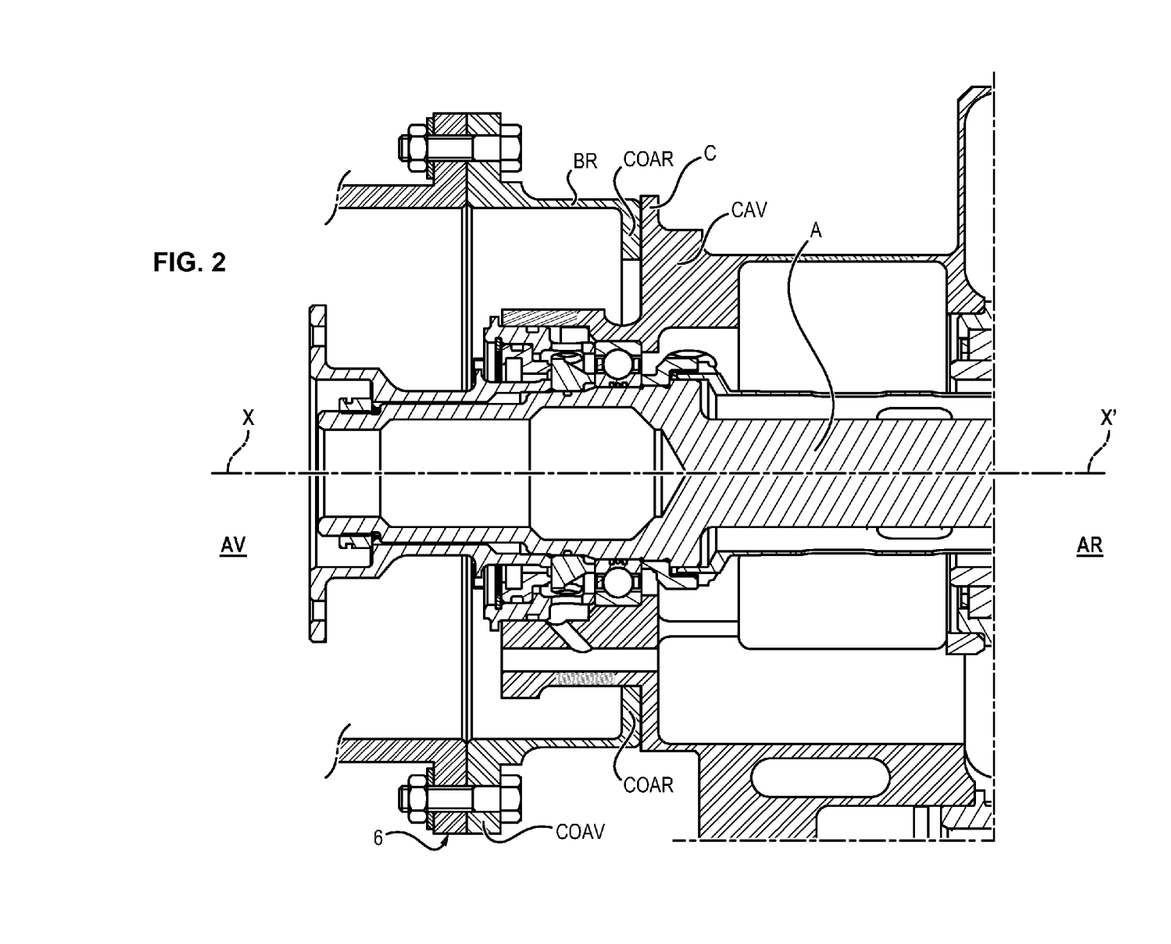
FIG. 2 is a longitudinal section view of the front end of the reduction gear of a drive train for a helicopter according to the prior art.

One known solution of the prior art appears in the appended FIG. 2, which shows a longitudinal section view of the front end of the front housing of the reduction gear. This front casing conforming to the prior art is labeled CAV.

In this figure can be seen the output shaft A of the prior art reduction gear, with longitudinal axis X-X'. It is housed in the front housing CAV.

A flange BR used for attaching the engine is interleaved between the main gearbox 6 and an annular collar C protruding toward the exterior from the front housing CAV.

More precisely, this flange BR has the shape of an annular sleeve, of which the front edge is folded toward the exterior so as to form a front collar COAV and of which the rear edge is folded toward the interior so as to form a rear collar COAR.

This flange BR is mounted coaxially with the longitudinal axis X-X', so that its rear collar COAR is attached, screwed for example, to the annular collar C of the front housing CAV and that is front collar COAV is attached, screwed for example, to the wall of the main gearbox 6.

This flange BR is considered a critical component. It takes the form of a massive part, made of steel and over-dimensioned so as to improve its mechanical strength.

The satisfaction of these criteria has a harmful impact on the mass of the flange, and on its cost.

PRESENTATION OF THE INVENTION

The invention has as its objective to retain the engine integral with the helicopter, more precisely with the main gearbox, in the event of rupture of the front housing of the reduction gear, while still avoiding the known disadvantages of the prior art.

To this end, the invention relates to a drive train for helicopters, which comprises at least one engine capable of supplying mechanical power, a reduction gear and a main gearbox designed to drive in rotation the rotor(s) of said helicopter, the reduction gear comprising an output shaft, driven in rotation by said engine and coupled in rotation with the input shaft of said main gearbox, the reduction gear being housed in housing in two assembled parts, called the "front housing" and the "rear housing," said output shaft being supported and guided in rotation by several rolling bearings mounted in said housings.

In conformity with the invention, this drive train comprises a mount designated "redundant", this redundant mount being disposed around the output shaft and between a wall of said main gearbox and the front end of the front housing, and this redundant mount is configured, dimensioned and attached to said wall of the main gearbox and to the front end of the front housing so as to create, in the event of rupture of said front housing, a secondary load absorbing path passing through this redundant mount, through the output shaft of the reduction gear and through said rolling bearings.

Thanks to these features of the invention, the redundant mount does not absorb any load when the front housing is in good condition. On the other hand, in the event of rupture of the front housing, this redundant mount creates a secondary absorbing path for loads existing at the front housing/main gearbox interface, and transmits these loads to the rest of the structure, in particular the output shaft of the reduction gear.

A secondary absorbing path is thus created for the loads of retaining the drive train on the helicopter, by re-directing the original function of the output shaft, and of the different rolling bearings.

According to other advantageous and non-limiting features of the invention, taken alone or in combination:

the redundant mount comprises a male portion and a female portion configured so that they can be assembled, the female portion being provided with a central opening surrounded by an interior ring, this female portion being disposed around the output shaft so that the latter passes through said central opening, this female portion being attached at its periphery to said wall of the main gearbox and to the front end of the front housing, the male portion being disposed around the output shaft of the reduction gear and being inserted in the central opening of the female portion, the male and female portions of the redundant mount and the front housing being configured and dimensioned so that when the male portion is attached to the front housing using attachment bolts passing through said female portion, it is in abutment against the exterior ring of one of the rolling bearings called the "front bearing" and there exists a first functional clearance between the male portion and the female portion of the redundant mount and a second functional clearance between the female portion and said front housing;

the front housing is provided with a reception recess for said output shaft, this recess being surrounded at its front end by an annular front edge drilled with threaded openings, the male portion of the redundant mount comprises a tubular sleeve which is extended at its front end by a peripheral collar called the "front collar," drilled with several attachment openings, the interior ring of the female portion is provided with attachment openings, the male portion of the redundant mount is disposed so that the output shaft of the reduction gear passes through the central passage of its tubular sleeve and that the latter passes through the central opening of the redundant mount and is housed in part in the reception recess of the front housing, and said male portion is attached to the front housing using attachment bolts passing through the attachment openings of the male portion, the attachment openings provided in the interior ring and the threaded openings of the front housing;

a pinion gear is interference fitted to the output shaft which drives it in rotation, this pinion gear is housed in part in the front housing and in part in the rear housing, said pinion gear and said output shaft are supported and guided in rotation by a rolling bearing, called "median," mounted in the front housing and by a rolling bearing, called "rear," mounted in the rear housing and in the event of rupture of the front housing the secondary load absorbing path passes through the redundant mount, the output shaft and said rolling bearings;

the redundant mount comprises a female portion which has an annular shape and which comprises an exterior peripheral ring, drilled with a first series of attachment openings, the front housing comprises a front collar with a flat radial annular portion drilled with first attachment openings, and the female portion of the redundant mount is attached by screwing to said flat radial annular portion of the front collar and to the wall of the main gearbox, using bolts and nuts, said bolts passing through the wall of the main gearbox, said first attachment openings of the exterior ring of the female portion and said first attachment openings of the flat radial annular portion of the front collar of the front housing;

the interior ring and the exterior ring of the female portion of the redundant mount are flat, extend in two distinct parallel planes and are joined to one another by an intermediate annular portion inclined toward the interior of the central opening of said female portion;

the inclined intermediate annular portion of said female portion is provided with an oil drainage opening;

the exterior ring of the female portion of the redundant mount is provided with second attachment openings allowing the passage of attachment bolts on the front collar of the front housing;

the male portion of the redundant mount is provided interiorly with a rotating seal of which the fixed ring is attached to the interior of the central passage of the male portion and of which the rotating ring is integral in rotation with the output shaft of the reduction gear;

the output shaft of the reduction gear is provided with a motion take-up sleeve interference fitted around the free end of this output shaft and the rotating ring of the rotating seal is mounted between the interior ring of the front bearing and the rear end of said motion take-up sleeve;

the rear end of the tubular sleeve of the male portion is drilled with a plurality of drainage openings which are located facing the rotating ring of the rotating seal when the male portion is attached to the front housing.

The invention also relates to a helicopter equipped with the aforementioned drive train.

PRESENTATION OF THE FIGURES

Other features and advantages of the invention will appear from the description which will now be made of it, with reference to the appended drawings, which represent, by way of indication but without limitation, a possible embodiment of it.

In these drawings.

DETAILED DESCRIPTION

Figure 3:
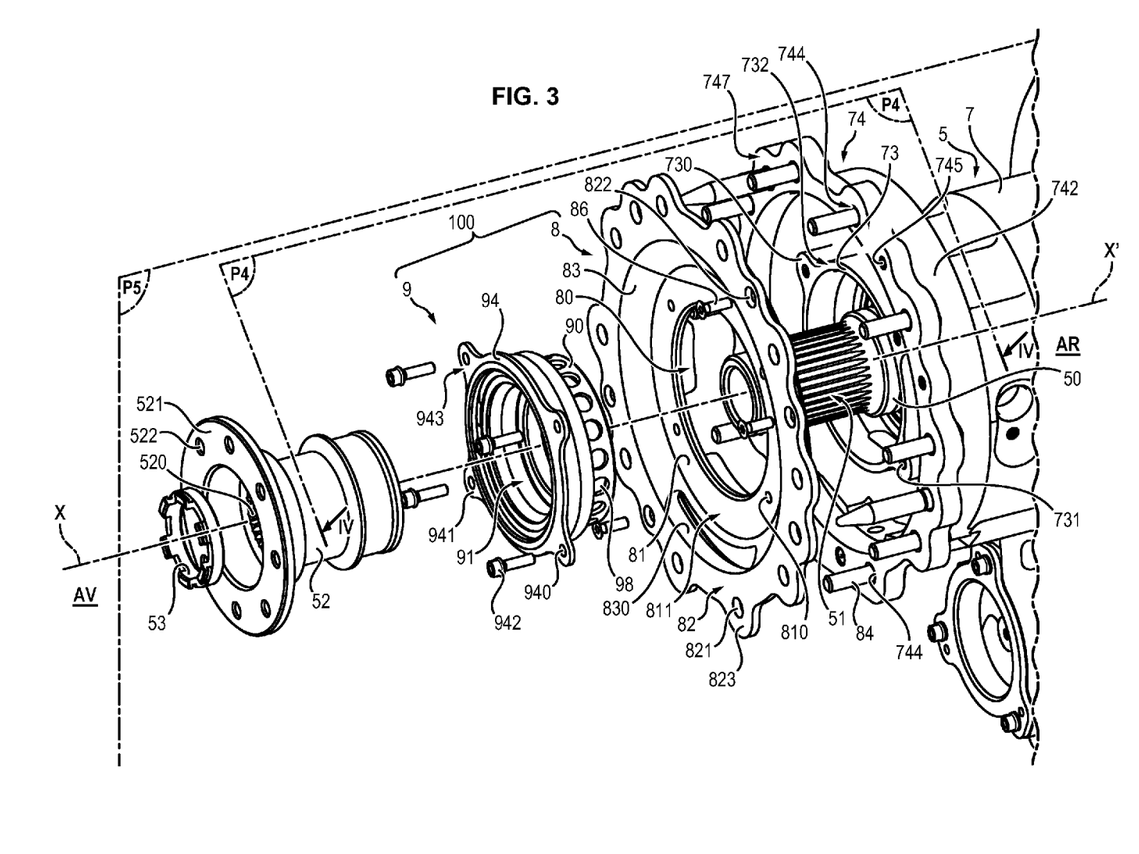
FIG. 3 is an exploded view in perspective, of the front end of the reduction gear of the drive train conforming to the invention, equipped with a redundant mount.
Figure 4:
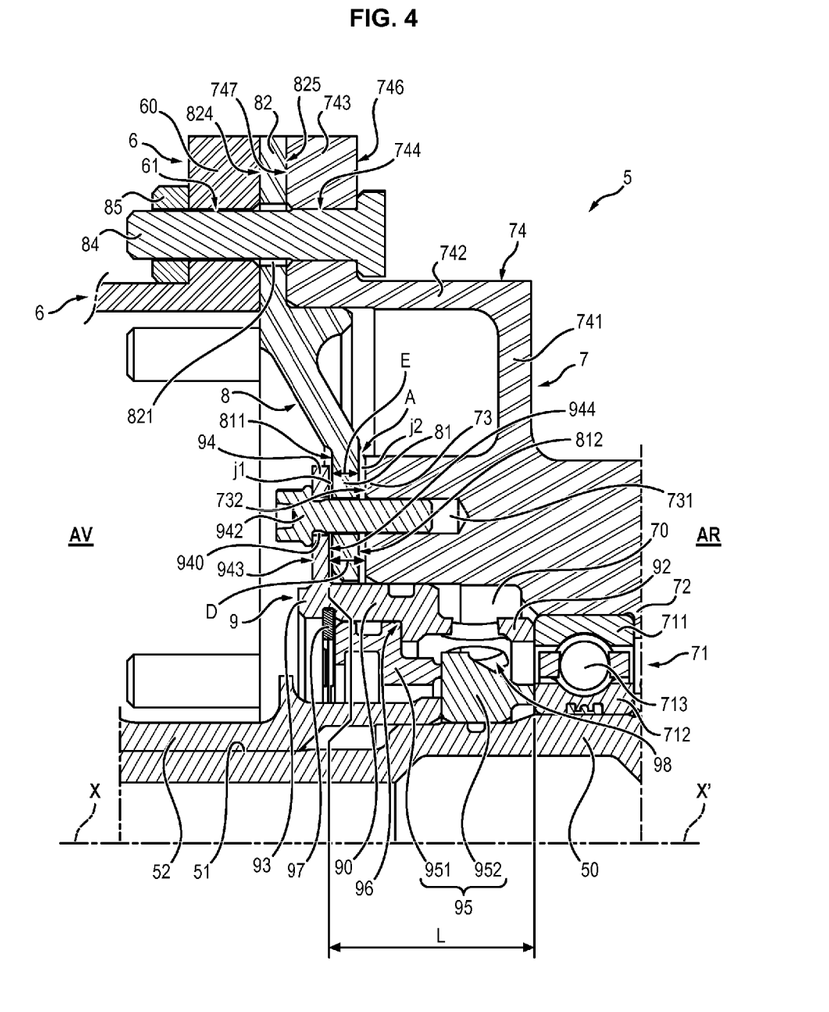
FIG. 4 is a longitudinal section view, at enlarged scale, of a portion of the reduction gear of FIG. 3, taken along the section plane P4, materialized by the line IV-IV of FIG. 3, the parts beings shown in the assembled state.
Figure 5:
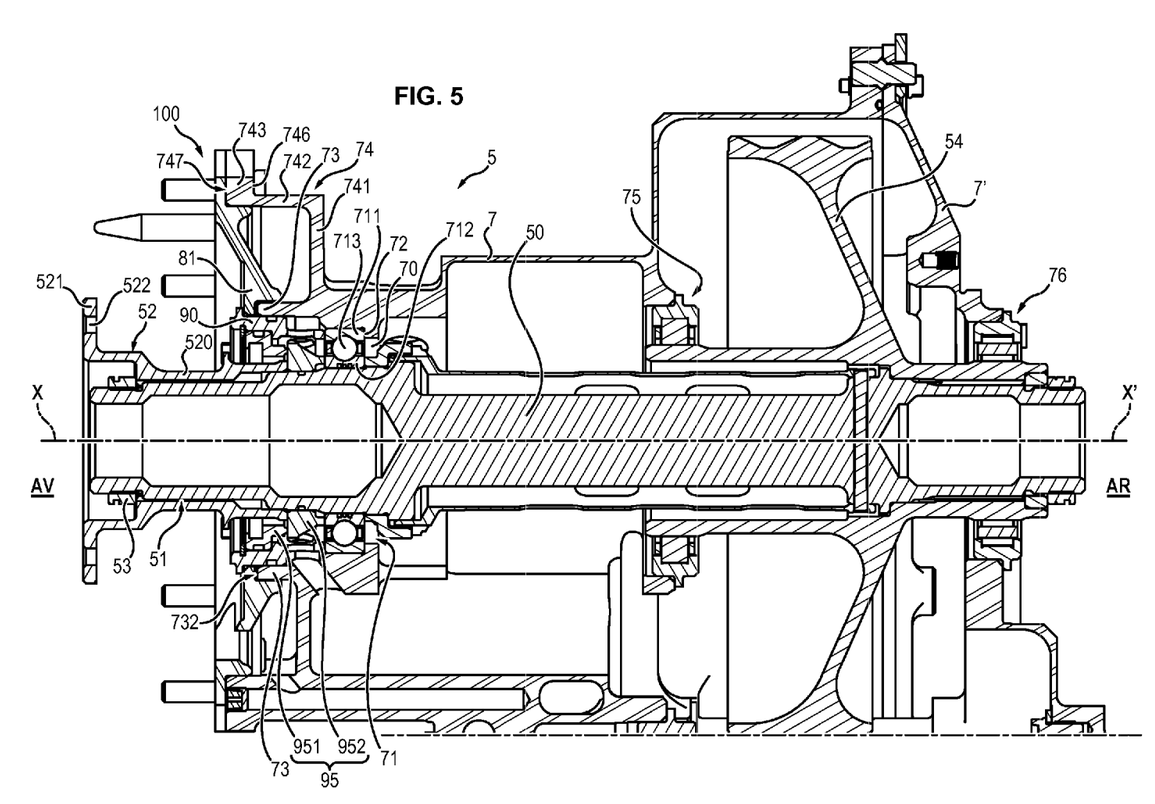
FIG. 5 is a longitudinal section view of a portion of the reduction gear of the drive train conforming to the invention, passing through the section plane P5 shown in FIG. 3, but which extends to the rear beyond the elements visible in FIG. 3.

In FIGS. 3 to 5, a portion of the reduction gear 5 can be seen, more precisely its front part.

The reduction gear 5 comprises an output shaft 50, driven in rotation by a drive shaft of the engine 4, not visible on these figures, preferably via a certain number of gear pairs, including a pinion 54.

The output shaft 50 extends along a longitudinal axis X-X'. It has, at the periphery of its front end, a series of splines 51.

A motion take-up sleeve 52 is mounted at the front end of the output shaft 50.

This sleeve 52 has in its interior a series of interior splines 520, capable of cooperating with the splines 51.

The sleeve 52 also has at its front end a peripheral front collar 521, drilled with a plurality of openings 522.

The sleeve 52 is coupled with the output shaft 50 so that the splines 520 and 51 cooperate. It is retained axially in this position by a nut 53, such as a self-locking nut.

The rotation of the shaft 50 drives the rotation of the sleeve 52. The latter can be coupled with the input shaft of the main gearbox 6, this input shaft being equipped with a sleeve similar to the sleeve 52 but not shown in the figures. The two sleeves can be assembled by means of bolts disposed through the openings 522.

The reduction gear 5 is housed in the interior of a housing which protects it, this housing being made in two portions assembled to one another by appropriate attachment means, namely a front housing 7 which protects the front end of the reduction gear, situated in proximity to the main transmission 6 and a rear housing 7' of which only a portion is visible in FIG. 5.

The front housing 7 is more fragile, because it has smaller dimensions that the rear housing 7'.

The front housing 7 comprises a recess 70 for receiving the output shaft 50 of the reduction gear, with longitudinal axis X-X'. Advantageously, the front end of the output shaft 50 of the reduction gear is supported there and guided in rotation by a rolling bearing called the "front bearing" 71, such as a ball bearing.

Preferably, the front housing 7 has, in the interior of the recess 70, a shoulder 72 designed to block axially toward the rear the exterior ring 711 of said front bearing 71.

This front bearing 71 also comprises an interior ring 712 and a plurality of balls 713.

The housing 70 is delimited on the front side, by a front annular edge 73 in which threaded openings are provided.

Advantageously, this edge 73 comprises a plurality of lugs 730, four in number for example, preferably uniformly distributed on the periphery of the edge 73. The threaded openings 731 are drilled into these lugs 730.

The flat front face of the lugs 730 and of the front edge 73 is labeled 732.

The front housing 7 is also provided at its periphery with a collar 74, called the "front collar."

In the exemplary embodiment shown in the figures, the collar 74 comprises an annular radial portion 741, which extends toward the front in a cylindrical portion 742, then again toward the exterior by a radial annular portion 743 called the "end portion," (see FIG. 5).

The cylindrical portion 742 is coaxial with the axis X-X'.

The two annular portions 741 and 743 extend in a plane perpendicular to the axis X-X'. The annular portion 741 is pulled back toward the rear with respect to the edge 73 of the recess 70.

The end portion 743 of the collar 74 is drilled from side to side with several openings, namely through openings 744, called "first attachment openings" and blind openings 745, called "second attachment openings."

Advantageously, and as appears more clearly in FIG. 3, the periphery of the end portion 743 of the collar 74 is corrugated so as to define lobes around the openings 744, 745 and less wide zones between these openings, so as to lighten the mass of the front housing 7.

The end portion 743 has a flat front face 747 and an opposite rear face 746.

Preferably, the two front faces 732 of the edge 73 and 747 of the collar 74, extend in parallel and preferably also distinct planes, the face 732 being situated further to the rear with respect to the face 747.

Moreover, the pinion gear 54 is interference fitted on the output shaft 50 which drives it in rotation. This interference fit is accomplished for example by a spline connection.

As can be seen in FIG. 5, this pinion gear 54 is housed in part in the front housing 7 and in part in the rear housing 7'.

Preferably, the pinion 54 and the portion of the output shaft 50 around which it is mounted are supported and guided in rotation by two rolling bearings, called "median bearings" 75 and "rear bearing" 76, such as ball or roller bearings. The median bearing 75 is mounted and retained in the interior of the front housing 7 and the rear bearing 76 in the interior of the rear housing 7'.

In conformity with the invention, the transmission assembly 3 comprises a redundant mount 100.

The term "redundant" designates the fact that this mount 100 duplicates a portion of the front housing 7, which plays no role when the front housing 7 is complete and not degraded and which only supplements the role of structural support of the front housing 7 when the latter is damaged or ruptured.

One exemplary embodiment of this redundant mount 100 will now be describe in connection with the figures.

This redundant support 100 comprises a female portion 8 and a male portion 9, configured so that they can be assembled.

The female portion 8 has a generally annular shape; it is provided with a central opening 80, preferably of the same diameter as the opening in the reception recess 70 at its front annular edge 73.

Preferably, the female portion 8 has the general shape of a "hollow plate" the bottom of which is pierced by the central opening 80, so as to delimit an interior flat annular ring 81.

The female portion 8 also comprises an external peripheral flat annular ring 82 and, between the two, an intermediate annular portion 83 inclined toward the interior of the central opening 80 and toward the rear AR.

The interior ring 81 and the exterior ring 82 thus extend in two parallel planes, preferably distinct, perpendicular to the longitudinal axis X-X', the interior ring 81 being situated more to the rear AR than the exterior ring 82.

The interior ring 81 has a plurality of attachment openings 810 passing through it from side to side, four in number for example.

The flat interior ring 81 has a front face 811 and an opposite rear face 812.

The exterior ring 82 has a plurality of first attachment openings 821 and second attachment openings 822 passing through it from side to side.

Advantageously, the edge of the exterior ring 82 has a corrugated shape, so as to define lobes 823 around the attachment openings 821 and 822 and less wide zones between two of these successive openings, so as to lighten the mass of the female portion 8.

As appears more clearly in FIG. 4, the exterior ring 82 has a flat front support face 824 and a flat rear support face 825.

As can be seen in FIGS. 3 and 4, the first attachment openings 821 are designed to receive bolts 84 which allow the female portion 8 to be assembled, on the one hand, with the collar 74 and on the other hand to the wall of the main gearbox 6.

Preferably, the main gearbox 6 also comprises a collar 60 around its input shaft, this collar 60 being drilled with openings designed to receive the bolts 84. These bolts 84 cooperate with nuts 85.

Moreover, and as can be seen in FIG. 3, the second attachment openings 822 allow the reception of bolts 86 of which the end is designed to be received in the second attachment openings 745 of the collar 74 of the front housing 7. These bolts 86 allow ensuring the attachment of the exterior ring 82 against the portion 743 of the collar 74, in particular during disassembly of the engine, when the reduction gear is separated from the main gearbox 6. The redundant mount thus remains correctly assembled to the reduction gear 5.

It will be noted that the interior ring 81 has a thickness E (see FIG. 4).

In addition, advantageously, the intermediate inclined portion 83 has a drainage opening 830, having preferably the shape of a circular arc. Finally, advantageously, the female portion 8 is made of aluminum.

The male portion 9 (or "shell") comprises a tubular portion 90 delimiting a central passage 91 of which the longitudinal axis is coaxial with the longitudinal axis X-X' of the output shaft 50 of the reduction gear, when this male portion 9 is mounted in the interior of the reduction gear.

The inner diameter of the central passage 91 is greater than the outside diameter of the output shaft 50.

This male portion 9 has a rear end 92 and a front end 93 (see FIG. 4).

The front end 93 is extended radially toward the exterior by a collar 94.

This collar 94 is drilled with openings 940. Advantageously, it has several lugs 941, four in number for example, in which are provided the openings 940. The openings 940 allow the passage of bolts 942 of which the end is designed to be received in the threaded openings 731 off the front housing 7 (see FIG. 3).

The bolts 942 also pass through the attachment openings 810 of the interior ring 81 of the redundant mount.

The collar 94 has a flat front face 943 and an opposite rear face 944.

The male portion 9 is also equipped with a rotating seal 95 comprising a fixed ring 951 and a rotating ring 952. The rotating ring 952 has an interference fit around the output shaft 50 of the reduction gear. It is retained axially toward the rear, by the interior ring 712 of the front bearing 71 and toward the front, by the rear end of the force take-up flange 52.

The tubular portion of the male portion 9 has in its interior an annular shoulder 96, which allows the fixed ring 951 to be retained axially toward the rear. This is also held forward by an elastic ring 97 received in an internal annular groove of the tubular portion 90 of the male portion 9.

Advantageously, the tubular portion 90 of the male portion 9 has, in its rear portion, a plurality of drainage openings 98, which extend facing the rotation ring 952 of the rotating seal 95. These openings 98 allow the removal of the oil which would flow out of the rotating seal, in the direction of the central passage 70.

The opening of the drainage 830 also allows this removal of oil from the rotating seal.

Advantageously, and as appears more clearly in FIG. 4, the front housing 7, the female portion 8 and the male portion 9 are dimensioned and configured so that when the male portion 9 is mounted on the housing 7, by being screwed using bolts 942, its rear end 92 comes into abutment against the exterior ring 711 of the front bearing 71, while its collar 94 is spaced from the face 732 of the rim 73 of the housing 7. There thus exists a space A between the rear face 944 of the collar 94 and the front face 732 of the front housing 7.

In other words, the length L between the rear end 92 of the male portion 9 and the interior face 944 of the collar 94 is such that there always exists this space A when the rear end 92 of the male portion 9 is in abutment against the exterior ring 711 of the front face 71.

Also, preferably, the female portion 8 and the front housing 7 are configured so that when the female portion 8 is mounted (as previously described), so that its peripheral ring 82 is pressed against the front housing 7 and the wall (collar 60) of the main gearbox 6, its interior ring 81 is positioned in the space A and the distance D between the rear face 944 of the collar 94 and the front face 732 of the edge 73 of the front housing 7 is greater than the thickness E of the interior ring 81.

Thus, preferably, the parts 7, 8 and 9 are configured so that there always exists a first functional clearance j1 between the rear face 944 of the collar 94 and the front face 811 of the interior ring 81 and a second functional clearance j2 between the front face 732 of the front housing 7 and the rear face 812 of the interior ring 81.

Consequently, when the front housing 7 is not damaged, it plays fully its role of absorbing loads which are exerted at the connection between this housing 7 and the wall of the main gearbox 6 to which it is attached. These loads are transmitted directly by the front housing in the rest of the structure of the engine, without passing through the redundant mount 100.

Conversely, in the event of rupture of the front housing 7 and in particular of its collar 74, and more generally of its smaller-diameter portion situated before the median bearing 75, the redundant mount 100 then plays fully its role of emergency support and loads are transmitted via this mount 100 to the edge 73 of the front housing 7, to the front bearing 71, to the output shaft of the reduction gear 50, to the pinion 54 and to the median 75 and rear 76 bearings, these two bearing themselves being attached to the structure by their respective exterior rings.

An alternative or secondary load absorbing path has thus been created.

It will be noted that, if the rupture of the front housing 7 occurs between the front bearing 71 and the median bearing 75, the redundant mount 100 plays fully its role of emergency support and allows the creation of the alternative or secondary load absorbing path.

The invention claimed is:

1. A drive train for a helicopter, the drive train comprising:
an engine capable of supplying mechanical power;
a reduction gear and a main gearbox designed to drive in rotation a rotor of said helicopter, the reduction gear comprising an output shaft, driven in rotation by said engine and coupled in rotation with an input shaft of said main gearbox, the reduction gear being housed in a housing formed of a front housing and a rear housing assembled together, said output shaft being supported and guided in rotation by several rolling bearings including a front rolling bearing, mounted in said housings; and
a redundant mount,
wherein said redundant mount is disposed around the output shaft and between a wall of said main gearbox and a front end of the front housing,
wherein the redundant mount comprises a male portion and a female portion configured to be assembled together, the female portion being provided with a central opening surrounded by an interior ring, the female portion being disposed around the output shaft so that the output shaft passes through said central opening, the female portion being attached at a periphery thereof to said wall of the main gearbox and to the front end of the front housing, the male portion being disposed around the output shaft of the reduction gear and being inserted in the central opening of the female portion, the male and female portions of the redundant mount and the front housing being configured and dimensioned so that when the male portion is attached to the front housing using attachment bolts passing through said female portion, the male portion is in abutment against an exterior ring of the front rolling bearing, wherein a first functional clearance exists between the male portion and the female portion of the redundant mount and a second functional clearance exists between the female portion and said front housing, and wherein said redundant mount is configured, dimensioned and attached to said wall of the main gearbox and to the front end of the front housing so as to create, in an event of rupture of said front housing, a secondary load absorbing path passing through the redundant mount, through the output shaft of the reduction gear and through said rolling bearings.

2. The drive train according to claim 1, wherein the front housing is provided with a reception recess for said output shaft, a front end of the reception recess being surrounded by an annular front edge drilled with threaded openings, wherein the male portion of the redundant mount comprises a tubular sleeve, a front end of the tubular sleeve being extended at its front end by a front peripheral collar drilled with several attachment openings, wherein the interior ring of the female portion is provided with attachment openings, wherein the male portion of the redundant mount is disposed so that the output shaft of the reduction gear passes through the central passage of the tubular sleeve and wherein the tubular sleeve passes through the central opening of the redundant mount and is housed in part in the reception recess of the front housing and wherein said male portion is attached to the front housing using attachment bolts passing through the attachment openings of the male portion, the attachment openings provided in the interior ring and the threaded openings of the front housing.

3. The chive train according to claim 1, wherein a pinion gear is interference fitted to the output shaft which drives said pinion gear in rotation, and wherein the pinion gear is housed in part in the front housing and in part in the rear housing, wherein the rolling bearings include a median rolling bearing and a rear rolling bearing, wherein said pinion gear and said output shaft are supported and guided in rotation by the median rolling bearing mounted in the front housing and by the rear rolling bearing mounted in the rear housing and wherein in the event of a rupture of the front housing, the secondary load absorbing path passes through the redundant mount, the output shaft and said rolling bearings.

4. The drive train according to claim 1, wherein the female portion has an annular shape and which comprises an exterior peripheral ring, drilled with a first series of attachment openings, wherein the front housing comprises a front collar with a flat radial annular portion drilled with first attachment openings, and wherein the female portion of the redundant mount is attached by screwing to said flat radial annular portion of the front collar and to the wall of the main gearbox, using bolts and nuts, said bolts passing through the wall of the main gearbox, said first attachment openings of an exterior ring of the female portion and said first attachment openings of the flat radial annular portion of the front collar of the front housing.

5. The drive train according to claim 1, wherein the interior ring and an exterior ring of the female portion of the redundant mount are flat, extend in two distinct parallel planes and are joined to one another by an intermediate annular portion inclined toward an interior of the central opening.

6. The drive train according to claim 5, wherein the inclined intermediate annular portion of said female portion is provided with an oil drainage opening.

7. The drive train according to claim 5, wherein the exterior ring of the female portion of the redundant mount is provided with second attachment openings allowing the passage of attachment bolts on the front collar of the front housing.

8. The drive train according to claim 2, wherein the male portion of the redundant mount is provided interiorly with a rotating seal of which the fixed ring is attached to the interior of the central passage of the male portion and of which the rotating ring is integral in rotation with the output shaft of the reduction gear.

9. The drive train according to claim 8, wherein the output shaft of the reduction gear is provided with a motion take-up sleeve interference fitted around the free end of the output shaft and wherein the rotating ring of the rotating seal is mounted between the interior ring of the front bearing and a rear end of said motion take-up sleeve.

10. The drive train according to claim 8, wherein a rear end of the tubular sleeve of the male portion is drilled with a plurality of drainage openings which are located facing the rotating ring of the rotating seal when the male portion is attached to the front housing.

11. A helicopter, equipped with the drive train according to claim 1.

* * * * *